J. O'NEAL.
CYLINDER HEAD.
APPLICATION FILED OCT. 31, 1921.

1,435,129.

Patented Nov. 7, 1922.

James O'Neal
INVENTOR

BY Victor J. Evans
ATTORNEY

WITNESS:

Patented Nov. 7, 1922.

1,435,129

UNITED STATES PATENT OFFICE.

JAMES O'NEAL, OF ALBANY, ALABAMA.

CYLINDER HEAD.

Application filed October 31, 1921. Serial No. 511,853.

*To all whom it may concern:*

Be it known that I, JAMES O'NEAL, a citizen of the United States, residing at Albany, in the county of Morgan and State of Alabama, have invented new and useful Improvements in Cylinder Heads, of which the following is a specification.

This invention relates to engine cylinders, and has particular reference to the means for securing the head of the cylinder in place, the object being to eliminate the use of stud bolts which frequently injures the cylinder when the head of the cylinder is blown off, the invention providing means whereby the head of the cylinder can be easily associated with or removed from the cylinder as the occasion requires.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views and wherein.

Figure 1:
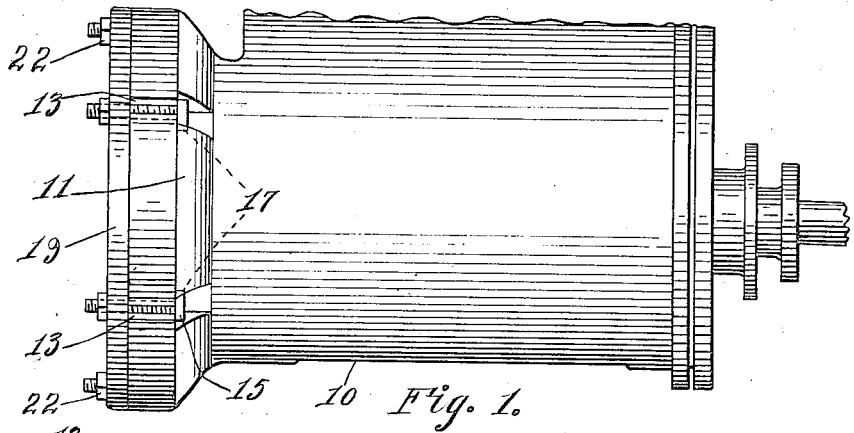
Figure 1 is a fragmentary elevation of a cylinder showing the head thereof secured to the cylinder in accordance with the present invention.

Referring to the drawing in detail, 10 indicates a cylinder block of well known construction, and each cylinder is formed with an extension 11 which rises above the cylinder and terminates to provide an annular flange 12. This flange is formed with a circumferential series of slots 13 to receive bolts 14 which are preferably provided with a T-shaped head 15. The heads 15 of the respective bolts are counter-sunk as at 17 in the undersurface of the flange 12 to prevent turning of the bolts as will be readily understood.

Figure 2:
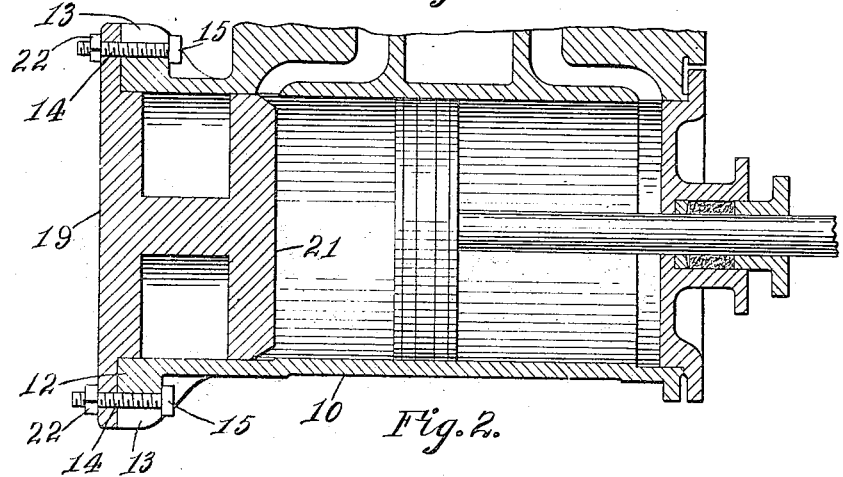
Figure 2 is a view similar to Figure 1, and partly in section.
Figures 3, 4:
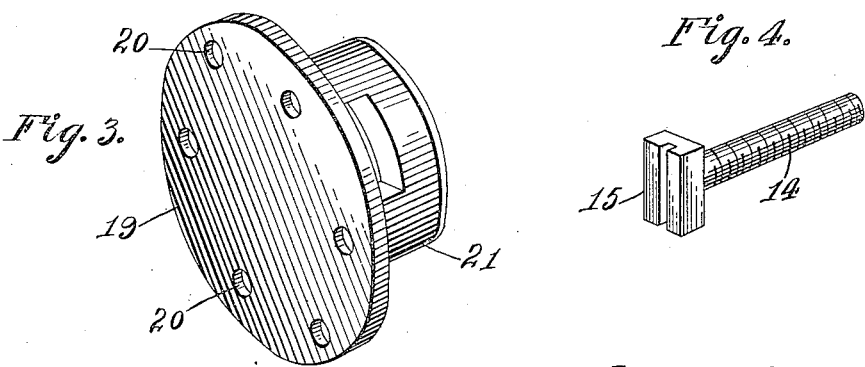
Figure 3 is a detail view of the head of the cylinder.
Figure 4 is a detail view of one of the fastening bolts.

The head of the cylinder is indicated at 19, and consists of a disc-like member having a plurality of openings 20 to receive the bolts 14. Depending from the head 19 is a tubular member 21 which is received by the extension 11 of the cylinder block and is of a size to terminate flush with the upper end of the cylinder as shown in Figure 2.

After the head has been associated with the cylinder in a manner described, nuts 22 are fitted on the bolts 14, and when tightened holds the head fixed relatively to the cylinder. The construction is such that the head cannot only be quickly assembled or disassembled with the block, but prevents the cylinder proper from being injured incident to the blowing off of the cylinder head which frequently occurs.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. An engine block including a cylinder, an extension rising therefrom, an annular flange forming part of the extension and having a plurality of slots, a cylinder head adapted to repose upon said flange and having a plurality of openings registering with said slots, a tubular member depending from the head and positioned within said extension, and fastening elements passed through said slots and openings to hold the head positioned upon the block.

2. An engine block including a cylinder, an extension rising therefrom, a flange forming part of said extension and having a plurality of slots, a cylinder head adapted to repose upon said flange, a tubular member depending from the head and arranged within said extension, said head having a plurality of openings registering with said slots, T-shaped bolts passed through said slots and openings, the heads of said bolts being counter-sunk on the underside of said flange, and nuts associated with said bolts for holding the head in position.

In testimony whereof I affix my signature.

JAMES O'NEAL.